United States Patent [19]

Gunderson et al.

[11] Patent Number: 5,054,088
[45] Date of Patent: Oct. 1, 1991

[54] SIGNATURE VERIFICATION DATA COMPRESSION FOR STORAGE ON AN IDENTIFICATION CARD

[75] Inventors: Steven C. Gunderson, Carmel, N.Y.; Aspi B. Wadia, Charlotte, N.C.

[73] Assignee: International Business Machines Corporation, Armonk, N.Y.

[21] Appl. No.: 409,906

[22] Filed: Sep. 20, 1989

[51] Int. Cl.[5] .............................................. G06K 9/00
[52] U.S. Cl. ..................................... 382/3; 340/825.34; 364/724.1; 382/13; 382/56
[58] Field of Search ............... 382/3, 56, 13; 364/419, 364/724.1; 358/426, 428, 431; 340/825.3, 825.34

[56] References Cited

U.S. PATENT DOCUMENTS

| 3,983,535 | 9/1976 | Herbst et al. | 382/3 |
|---|---|---|---|
| 4,040,012 | 8/1977 | Crane et al. | 382/3 |
| 4,128,829 | 12/1978 | Herbst et al. | 382/3 |
| 4,156,911 | 5/1979 | Crane et al. | 382/3 |
| 4,364,024 | 12/1982 | Paetsch | 382/3 |
| 4,453,267 | 6/1984 | Paganini et al. | 382/56 |
| 4,472,785 | 9/1984 | Kasuga | 364/724.1 |
| 4,553,258 | 11/1985 | Chainer et al. | 382/3 |
| 4,584,659 | 4/1986 | Stikuoort | 364/724.1 |
| 4,646,351 | 2/1987 | Asbo et al. | 382/3 |
| 4,689,759 | 8/1987 | Anovar et al. | 364/724.1 |
| 4,724,542 | 2/1988 | Williford | 382/3 |
| 4,725,972 | 2/1988 | Göckler | 364/724.1 |
| 4,736,445 | 4/1988 | Gundersen | 382/3 |
| 4,789,934 | 12/1988 | Gundersen | 364/419 |
| 4,932,066 | 6/1990 | Nukayama et al. | 382/56 |
| 4,952,117 | 8/1990 | Lagadec | 364/724.1 |

OTHER PUBLICATIONS

Abraham Peled and Bede Liu, "Digital Signal Processing Theory, Design, and Implementation", Chapter 2, Section 2.8, published by John Wiley and Sons, of New York.

Primary Examiner—David K. Moore
Assistant Examiner—Joseph Mancuso
Attorney, Agent, or Firm—Karl O. Hesse

[57] ABSTRACT

Apparatus and methods are described which take advantage of the peculiar characteristics of dynamic signature data while segmenting and compressing such data for storage on a limited capacity device. Compression is accomplished by digital oversampling, segmenting, filtering, decimating and later interpolating reference signature data, thereby allowing storage in compressed form without significant matching degradation. The pen down and pen up information which define signature segments is separated from the pressure waveform and stored in a separate array for each reference signature. The acceleration and pressure data are then filtered, decimated and stored for each reference signature. Later, during identity verification, the stored acceleration and pressure data are restored to an oversampled rate by interpolation. To verify the identity of a person supplying a trial signature, each segment of the trial signature is compared with corresponding segments of one or more of the stored reference signatures.

23 Claims, 15 Drawing Sheets

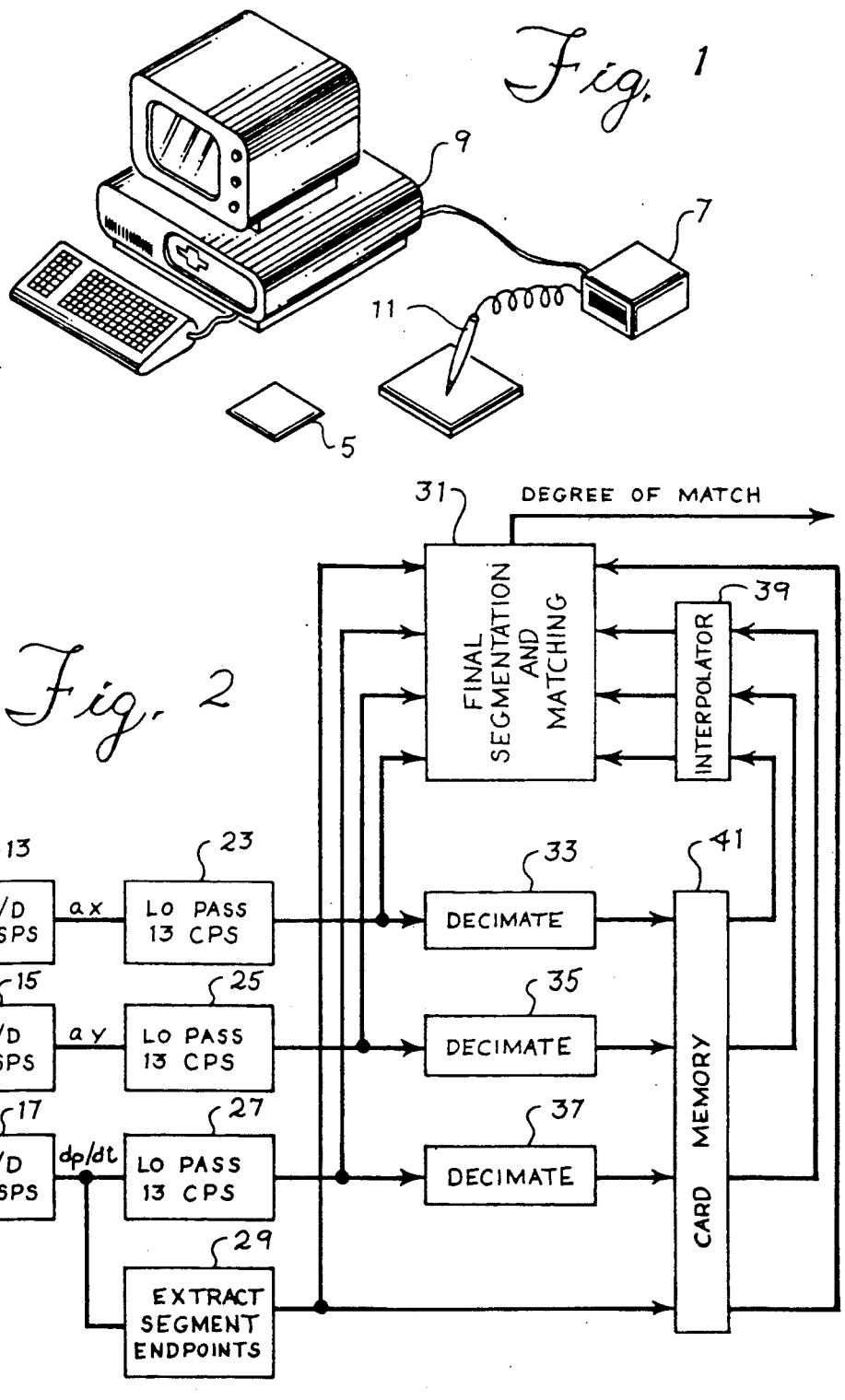

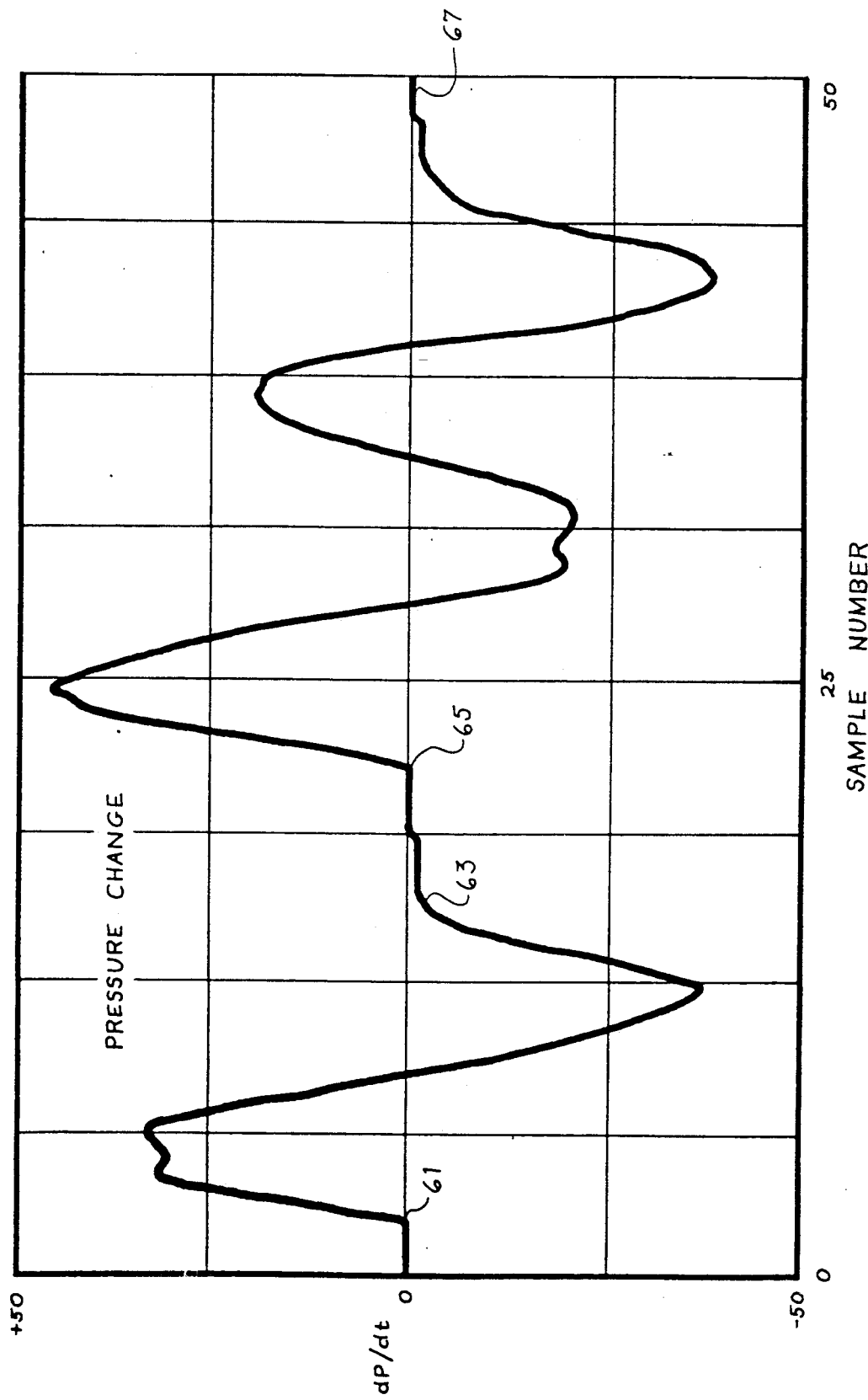

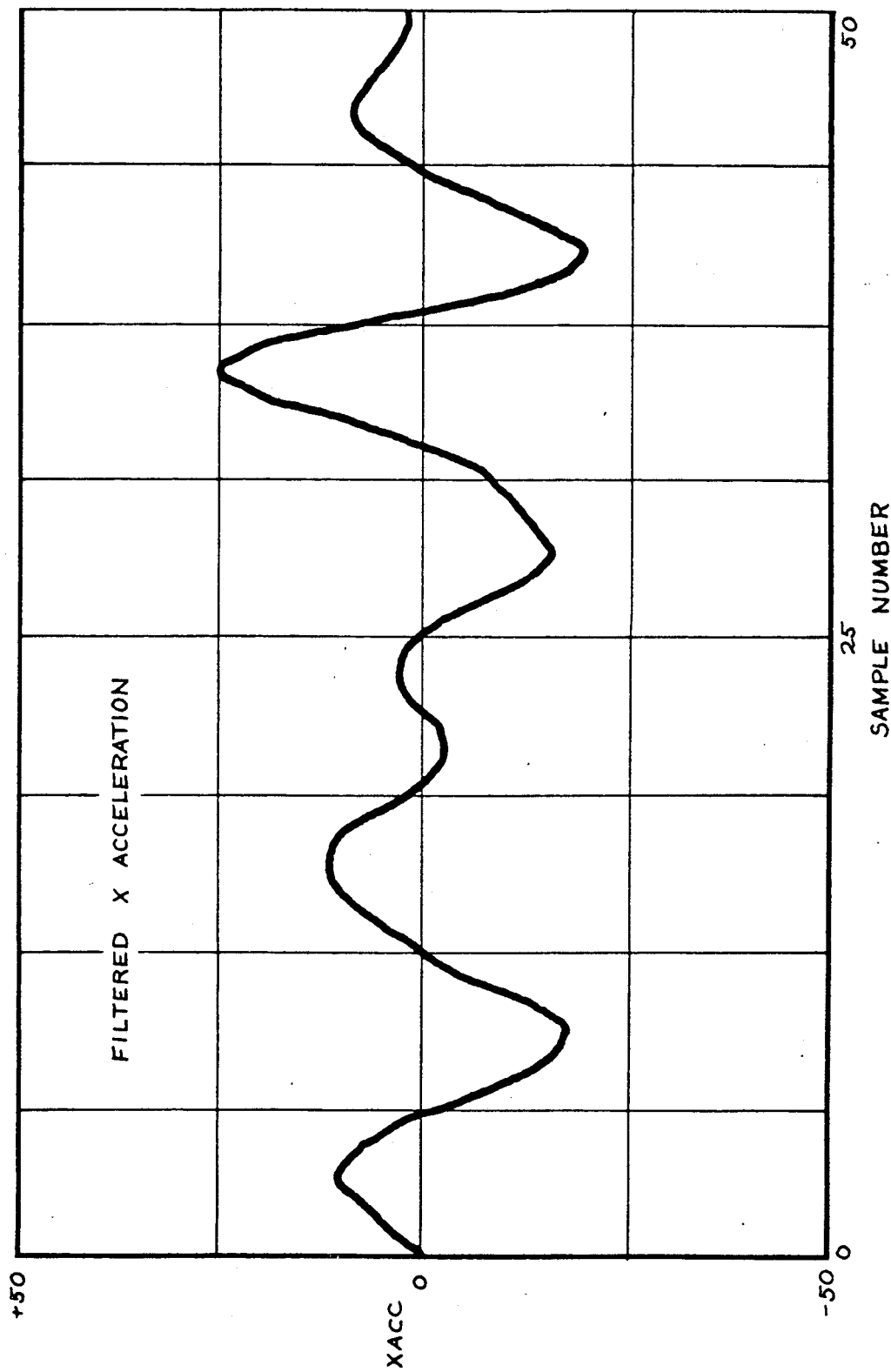

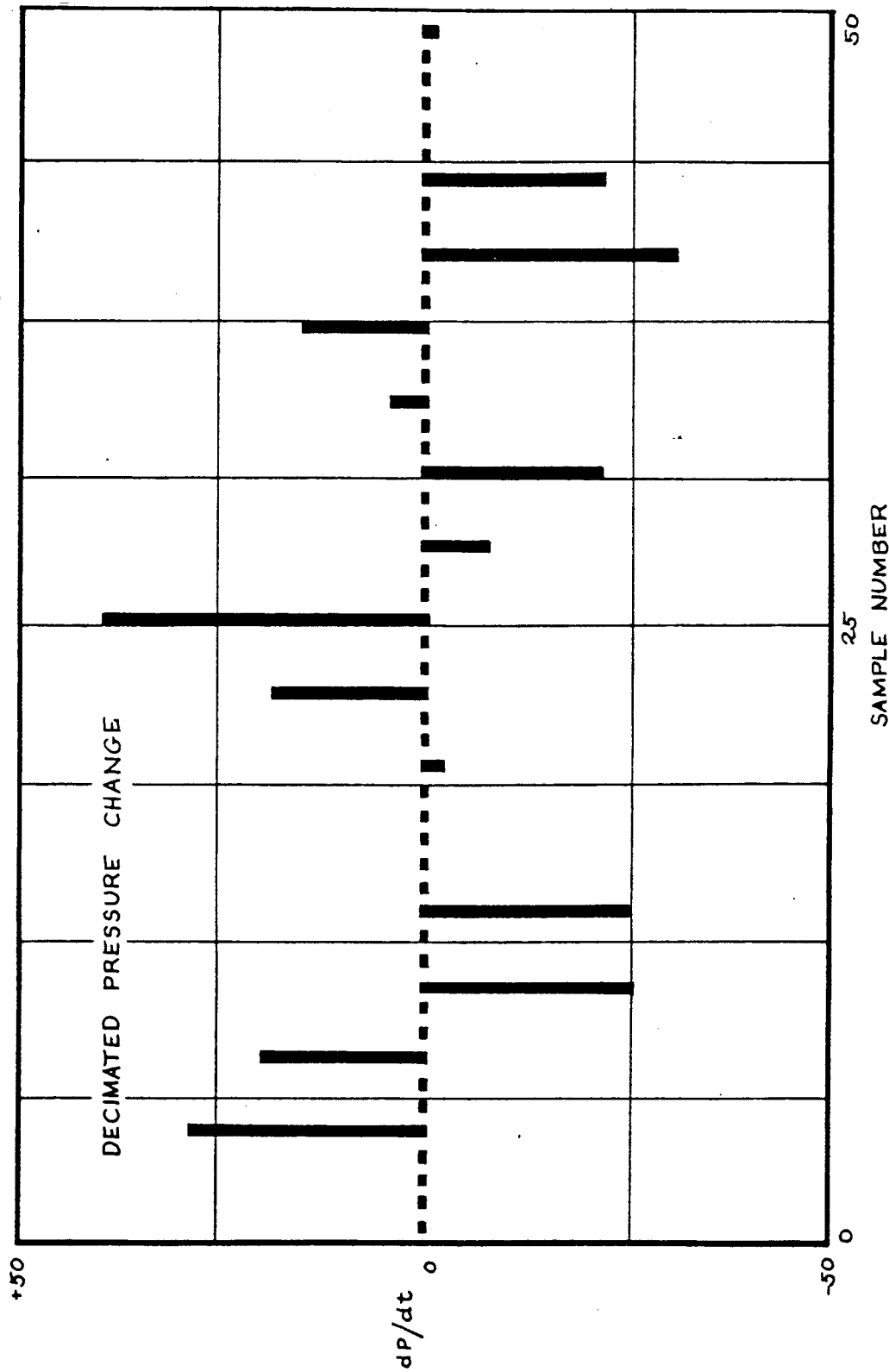

SIGNATURE VERIFICATION DATA COMPRESSION FOR STORAGE ON AN IDENTIFICATION CARD

BACKGROUND OF THE INVENTION

1. Field of the Invention

The present invention relates generally to the field of verifying the identification of the holder of an identification card, using signature verification methods. More specifically, the motion and pressure characteristics experienced by a pen while the signature is being signed are converted into digital data and compressed for storage in the memory of an identification card. Later, when the identity of a holder of the identification card is to be verified, a pen having substantially similar motion and pressure transducing characteristics is used by the person to generate a set of trial data while signing a trial signature. The trial data is matched to the expanded stored reference data and the correlation and coherence is a measure of the veracity of the identification of the holder.

2. Prior Art

Although a number of identification verification systems are in use today, the most popular is the use of a secret number or personal identification number, theoretically known only to the authorized holder of an identification card. This secret number is related to the identification card number, either by cryptographic algorithms or by data in a data base.

Verifying the identification of a person by other methods, including biological characteristics of a person, have been suggested. Identity by comparison of written signatures has long been practiced manually in executing financial transactions. More recently, precise mechanisms have been developed for capturing the dynamic motion characteristics experienced by a pen while a person attempts to sign a name for verifying his or her identity. The dynamic motion characteristics are then compared in a computer with the dynamic characteristic stored at the time an authorized holder of the card was enrolled into the computer system.

An example of this method is taught in U.S. Pat. Nos. 3,983,535 and 4,128,829 by Herbst et al. Comparison of the trial signature with the reference signature is accomplished by segmenting each block of signature data into similar segments and individually comparing similar segments using correlation and shifting of the segments to find regions of high correlation. Signature segmentation is taught by Chainer et al. in U.S. Pat. No. 4,553,258.

In addition to segmenting, it is known in the art to develop a similarity measure between two signatures. The similarity measure is a weighted function of the correlation, coherence and segmentation of the two signatures. Similarity and how it is derived from correlation, coherence and segmentation is described by S. Gundersen in U.S. Pat. Nos. 4,736,445 and 4,789,934.

An adaptive means of verification is described by Williford in U.S. Pat. No. 4,724,542.

These methods require that large amounts of data be stored for each signature in order to have high fidelity correlation and similarity measures. The requirement for storing large amounts of data has heretofore made storage of reference signature data directly on an identification card impractical. This difficulty is further accentuated when one realizes that signatures are of varying lengths. In a computer data base, reference signatures are stored end to end and therefore space need only be provided for the number of signatures to be stored times the average signature length. When signatures are stored on an identification card, space must be provided on the card for the maximum length signature.

The digital data corresponding to the dynamics of a person's signature is basically random in nature and therefore existing data compression techniques such as used in compressing coded text do not result in any significant reduction in storage space requirements. The simple expedient of sampling at lower sampling rates is not practical in the storage of digitized data for correlation because high sampling rates are needed in order to minimize phase error which otherwise adversely affects correlation scores.

It is known in the art to sample at high rates and convert the digital data sampling rates to a lower rate, for example, to transmit speech at a very low bit rate. It is also known to convert digital data sampled at one rate to a higher sampling rate in order to extract a narrow band of the spectrum of a signal for high resolution spectrum analysis. This is known as frequency zoom and is used in sonar and vibration signal analysis. Such methods are taught in Section 2.8 of chapter 2 in Digital Signal Processing Theory, Design, and Implementation by Abraham Peled and Bede Liu, published in 1976 by John Wiley and Sons, of New York.

SUMMARY OF THE INVENTION

The disadvantages and obstacles in the prior art are overcome in the present invention disclosed herein, by taking advantage of the peculiar characteristics of dynamic signature data, while applying segmentation and digital rate conversion methods to such data.

It is an advantageous effect of this invention that less total data needs to be stored. Because pen down and pen lift times are stored in an array separate from the digital data in each segment between pen down and pen lift points, the digital data can be compacted.

A further advantage of the invention is that the separate storage of pen down and pen lift information permits the segments between pen down and pen up to be stored at a digital sampling rate much lower than would otherwise be possible.

A further advantage of the invention is that the computation of the initial segmentation of the reference signatures resulting from the pen down and pen lift times during the initial signing of the reference signatures need be done only once.

It is a further advantage of the invention that it permits multiple signatures to be stored in a limited memory space such as is found in the "on card memory" of a high density magnetic stripe card, chip card, or smart card identification medium.

The invention finds particular utility when multiple reference signature data arrays need to be stored to accommodate changing writing characteristics and style of the person whose signature is being verified.

These and other advantages which will become more apparent from a reading of the following specification are accomplished by digital oversampling, segmenting, filtering, decimating and later interpolating reference signature data, thereby allowing storage in compressed form without significant correlation degradation. The oversampled dynamic signature acceleration and pressure waveforms (i.e., sampled at a rate of 4 to 8 times the frequency of the highest frequency component of the signature waveform to be preserved) are provided by a pen having acceleration and pressure transducers.

The pen down and pen up information is separated from the pressure waveform and stored in a separate array for each reference signature. The acceleration and pressure data are then filtered, decimated and stored for each reference signature. Later, during identity verification, the stored acceleration and pressure data are restored to an oversampled rate by interpolation.

To capture a trial signature for verifying the identity of a card holder, the acceleration and pressure waveforms created by transducers in the pen are oversampled at a rate that is higher than would be necessary to preserve the frequency content of interest in the waveform. The oversampling is done to achieve good correlation measures and coherence measures. The samples of the trial waveform are segmented at pen down and pen lift points according to the techniques described in U.S. Pat. No. 4,553,258 which is incorporated herein by reference. After the pen down and pen lift digital samples in the trial signature have been identified, the digital data are filtered, using a low pass filter to remove frequency components that contribute only to the pen down and pen lift transients. This puts the digital data representing the trial signature in the same form as the reference signature data will be after its sampling rate has been converted back to its original oversampled rate.

One way to interpolate between the stored samples of a reference signature in its compressed form proceeds as follows. The stored reference signal is retrieved from memory and one or more zero value samples are inserted in between each stored sample. The retrieved samples with added zero value samples are then passed through a low pass digital filter with the same characteristics as was used to filter the trial signature data. Another way to interpolate would be introduce two new samples between each two of the stored samples using linear fit techniques.

Depending upon the correlation and coherence algorithm used, it may be necessary after addition of zero value samples and filtering, to increase the amplitude of the digital values representing the reference signal, which has thereby been restored to the same oversampled sampling rate of the trial signature. With other correlation and coherence algorithms such normalizing of the reference signature amplitudes to the amplitude of the trial signature for correlation analysis is unnecessary as it occurs within the algorithm.

BRIEF DESCRIPTION OF THE DRAWINGS

FIG. 1 shows the environment of the invention.

FIG. 2 is a block diagram of the operative portions of the system of the invention.

FIGS. 3a, 3b and 3c are portions of signature waveforms in the vicinity of pen down and pen lift points showing the pen acceleration in two directions and the first derivative of the pressure.

FIGS. 4a, 4b and 4c are waveforms showing the data of FIGS. 3a, 3b, and 3c after filtering.

FIGS. 5a, 5b and 5c are the samples of acceleration and the first derivative of the pressure which remain after decimation by 2 out of 3.

PREFERRED EMBODIMENT OF THE INVENTION

DETAILED DESCRIPTION OF PREFERRED EMBODIMENT

Figure 3A:
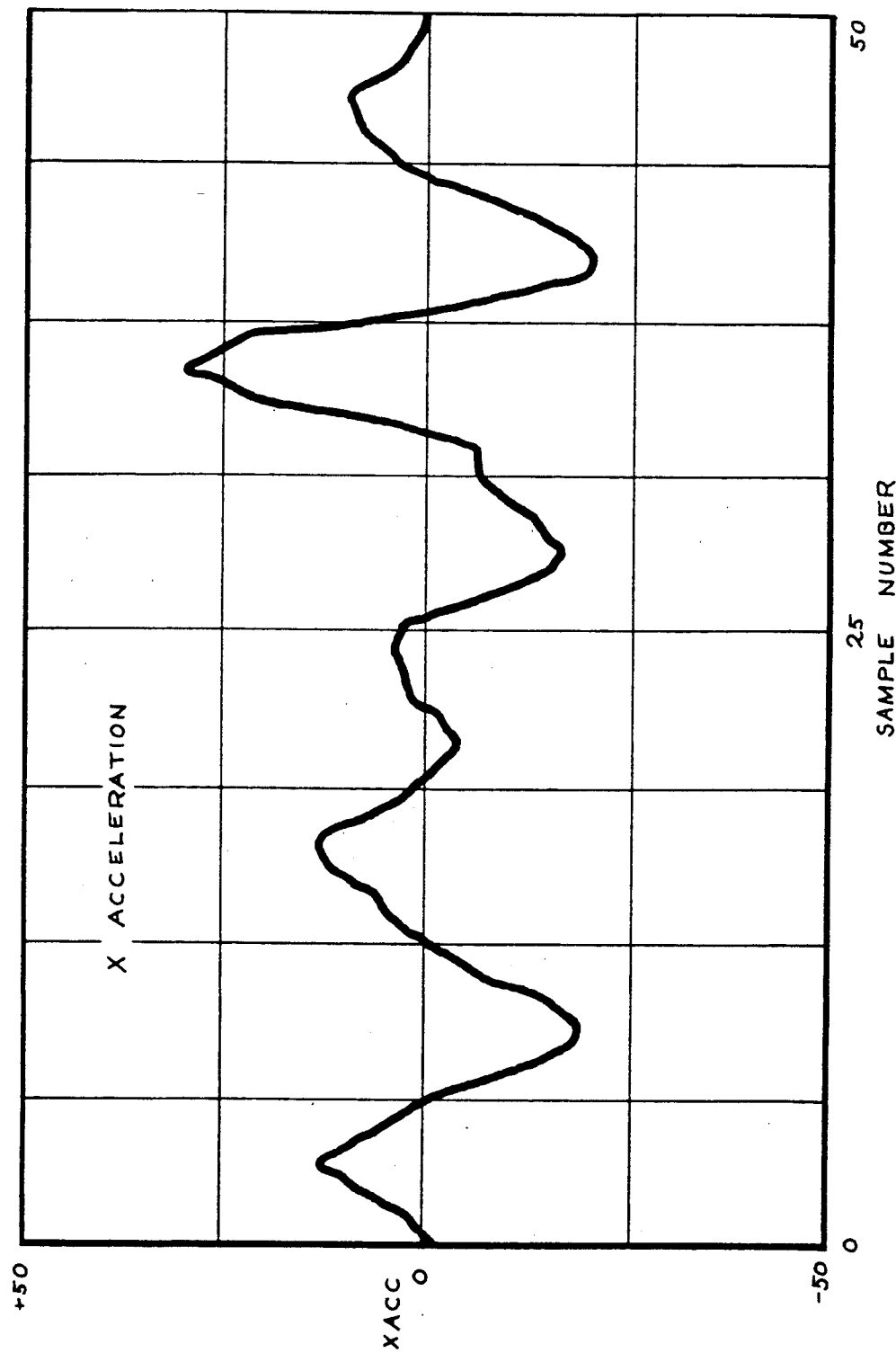

The environment in which the invention finds utility is set out in FIG. 1, where a sensor pen 11 is shown connected to an IC card reader 7 which is in turn connected to computer 9. An IC card 5 having a processor and memory is shown near the IC card reader 7. In operation, a user inserts the IC card into the card reader which reads identification information from card 5. In order to verify the identity of the user, programs in computer 9 display guidance messages to the user asking the user to provide a signature using pen 11. The programs in the computer then compare the identification information from the card with the data captured by the pen 11 to determine whether the user is the authorized holder of the card 5.

Referring now to FIG. 2, logic is shown that is used in the first instance to enroll a card holder into the memory of the card and is used in subsequent instances to verify the identity of the card holder. In FIG. 2, the sensor pen 11 is shown again, this time with its three output channels of dynamic signature signals. The pen provides acceleration outputs in an X and Y direction, and a first derivative of pressure in a Z direction, in accordance with the teachings of U.S. Pat. No. 4,513,437. Each channel of output from the pen is provided at the input of an analog to digital converter 13, 15 and 17. Each of these analog to digital converters sample the analog waveform 640 times per second and the each 8 samples are averaged to give one resulting sample. This gives a resultant sampling rate of 80 samples per second. These resultant samples are provided to the system as digital words of varying value. The digital words are shown in graphical form as waveforms ax, ay, and dp/dt in FIGS. 3a, 3b, and 3c respectively.

Figure 4B:
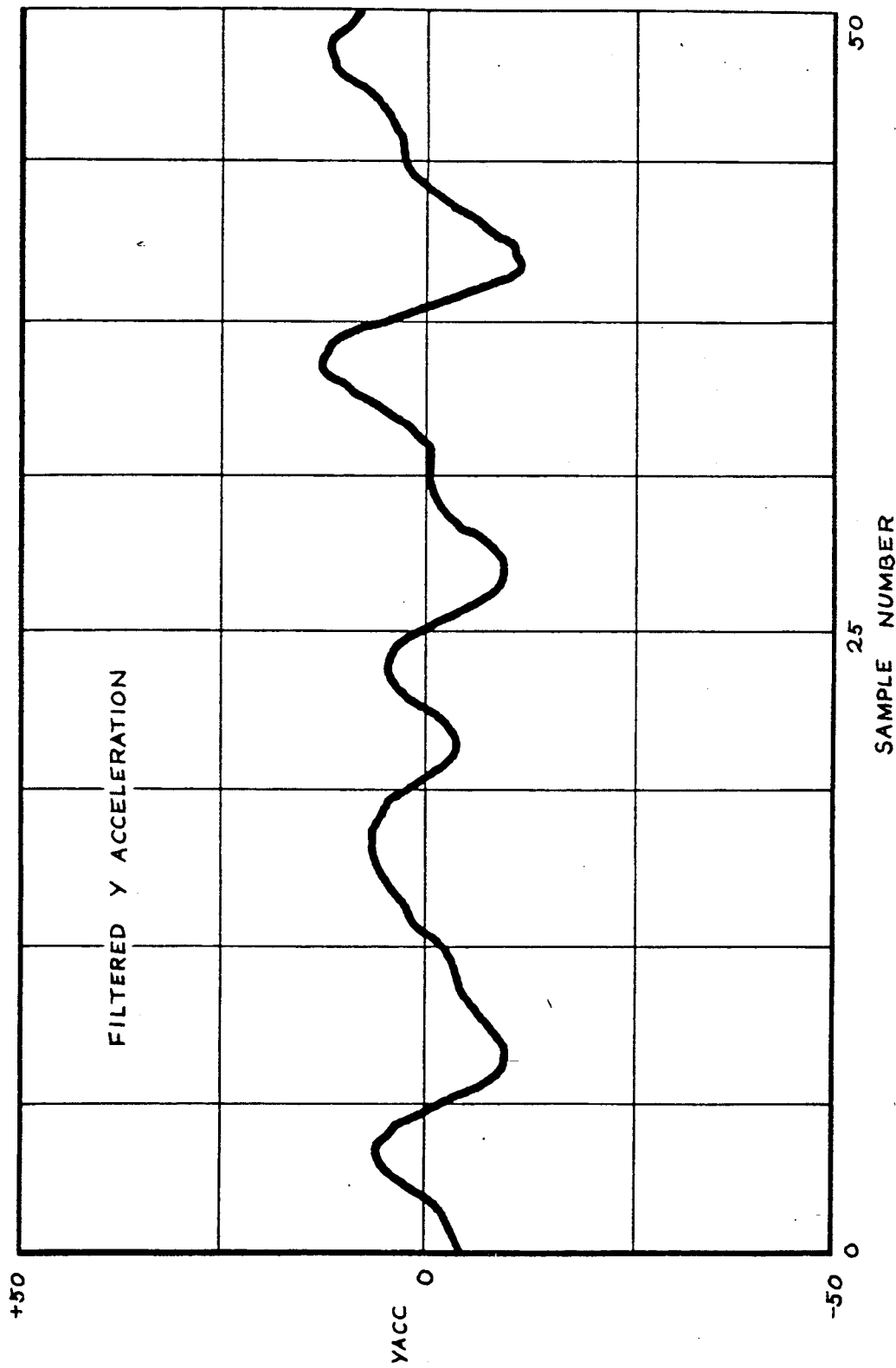
Figure 4C:
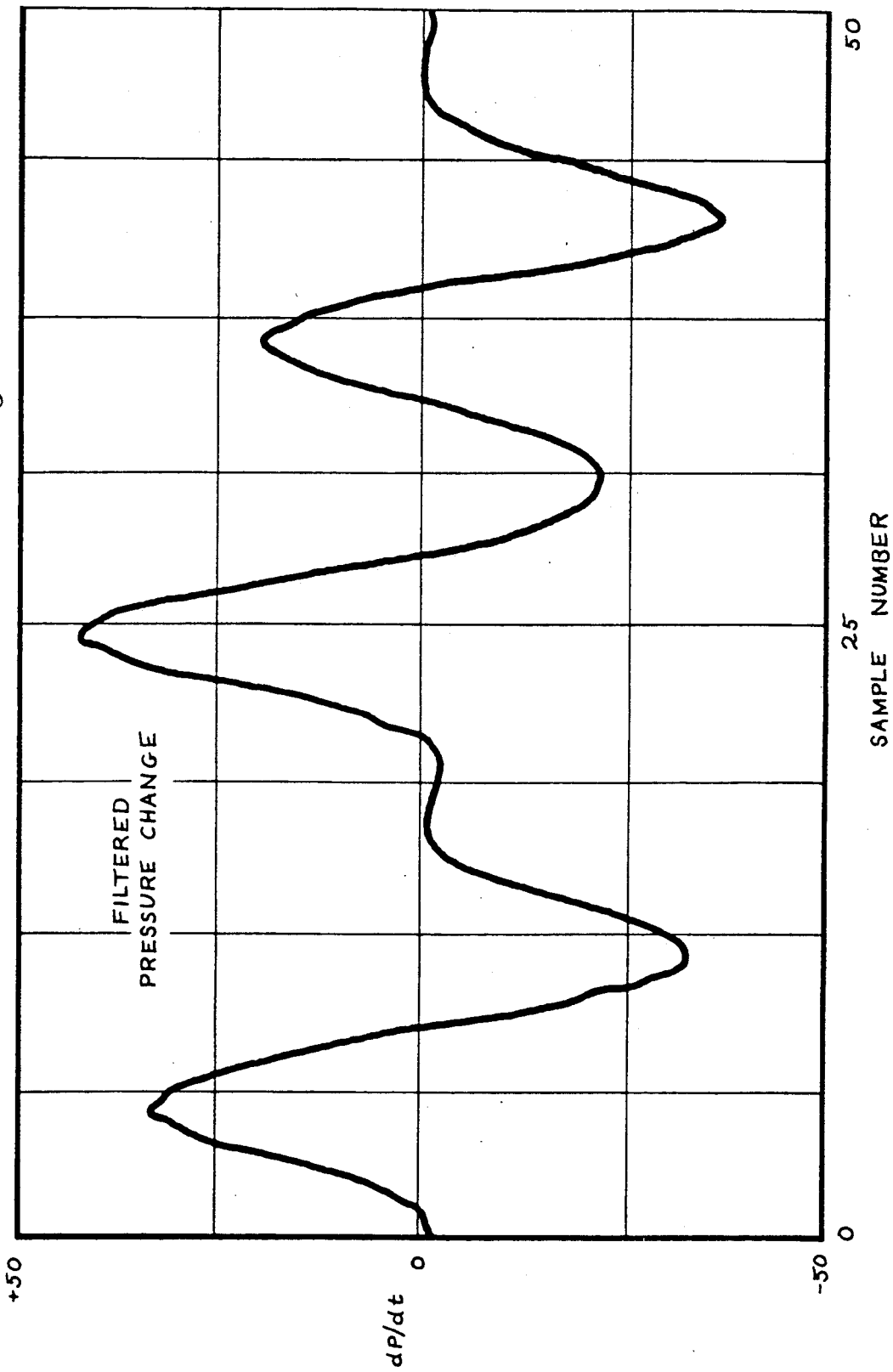

FIG. 2 shows the output ax of converter 13 being provided to low pass filter 23. Likewise the output ay from converter 15 is provided to filter 25 and the output dp/dt from converter 17 is provided to filter 27. Digital filters 23, 25, and 27 are non-recursive linear phase lowpass filters with a 6 DB rolloff occurring at 12.5 cycles per second. Filtering is done in the processor by a filter program which modifies the values of the input samples in accord with the filter algorithm. Digital filtering is known and is described in the textbook entitled Digital Signal Processing Theory, Design, and Implementation by Abraham Peled and Bede Liu, published in 1976 by John Wylie and Sons, of New York. The digital words representing the acceleration and changes in pressure after being filtered are shown in graphical form in FIGS. 4a, 4b, and 4c.

In addition to being filtered, the output dp/dt from converter 17 is passed to logic 29 which analyzes the samples to locate the points at which the pen was put down onto the paper and lifted up off of the paper. Again this logic is preferably embodied as a program which compares samples to adjacent samples to locate discontinuities. Examples of such discontinuities appear at 61, 63, 65 and 67 in FIG. 3c. 61 and 65 are pen down points and 63 and 67 are points when the pen was lifted from the paper. Details of this initial segmentation algorithm is taught by Chainer in U.S. Pat. No. 4,553,258.

Returning again to FIG. 2, the output from logic 29 is a series of points in time or values of time which are stored in a separate array in memory 41 of an identification card during enrollment of an authorized card holder. An example of such an array appears in Table II. During subsequent verification operation, this pen down and pen lift information is used to initially segment the acceleration and pressure change samples for use in matching segments of the reference signature to a segments of a trial signature.

Figure 5A:
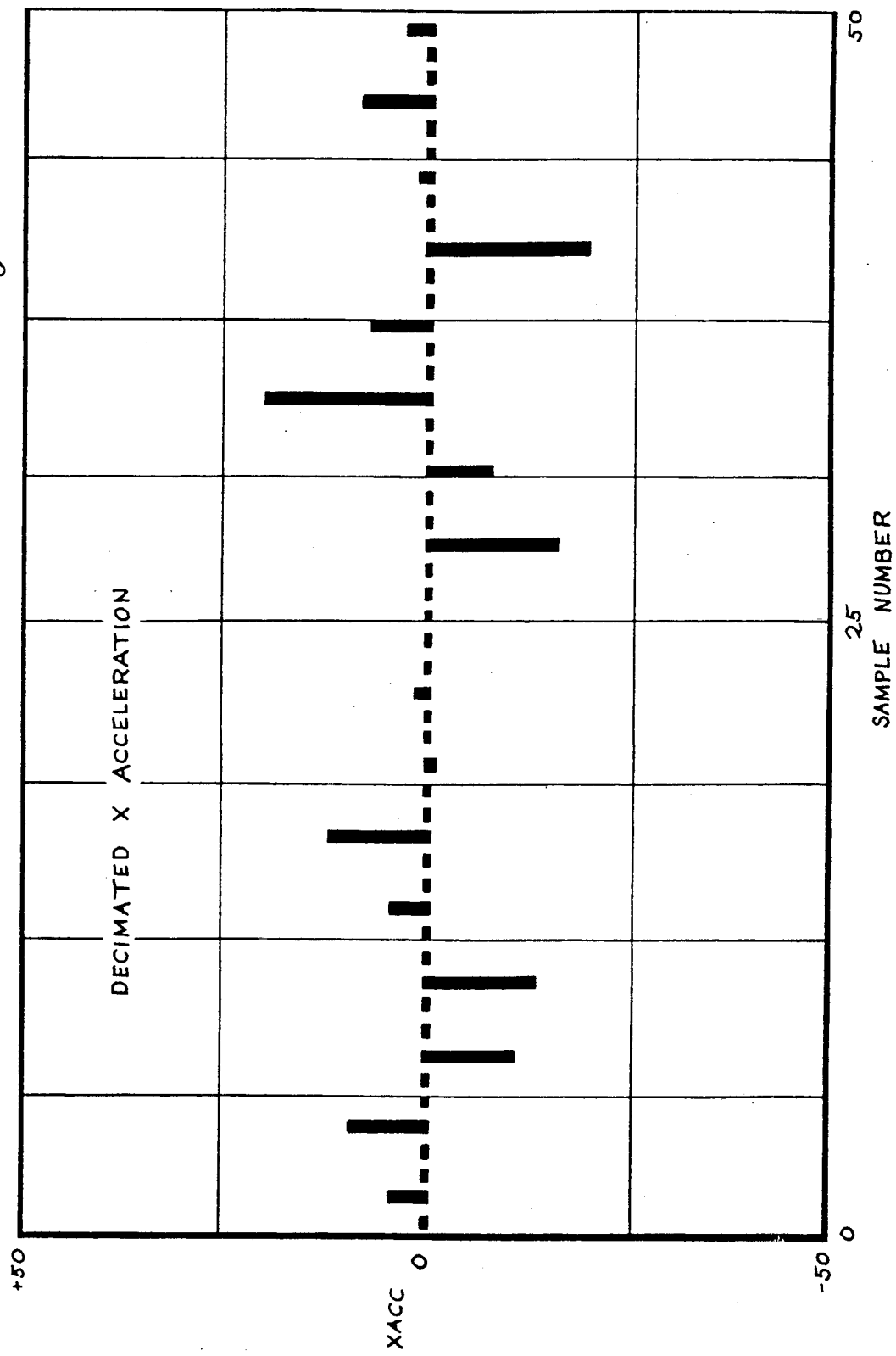
Figure 5B:
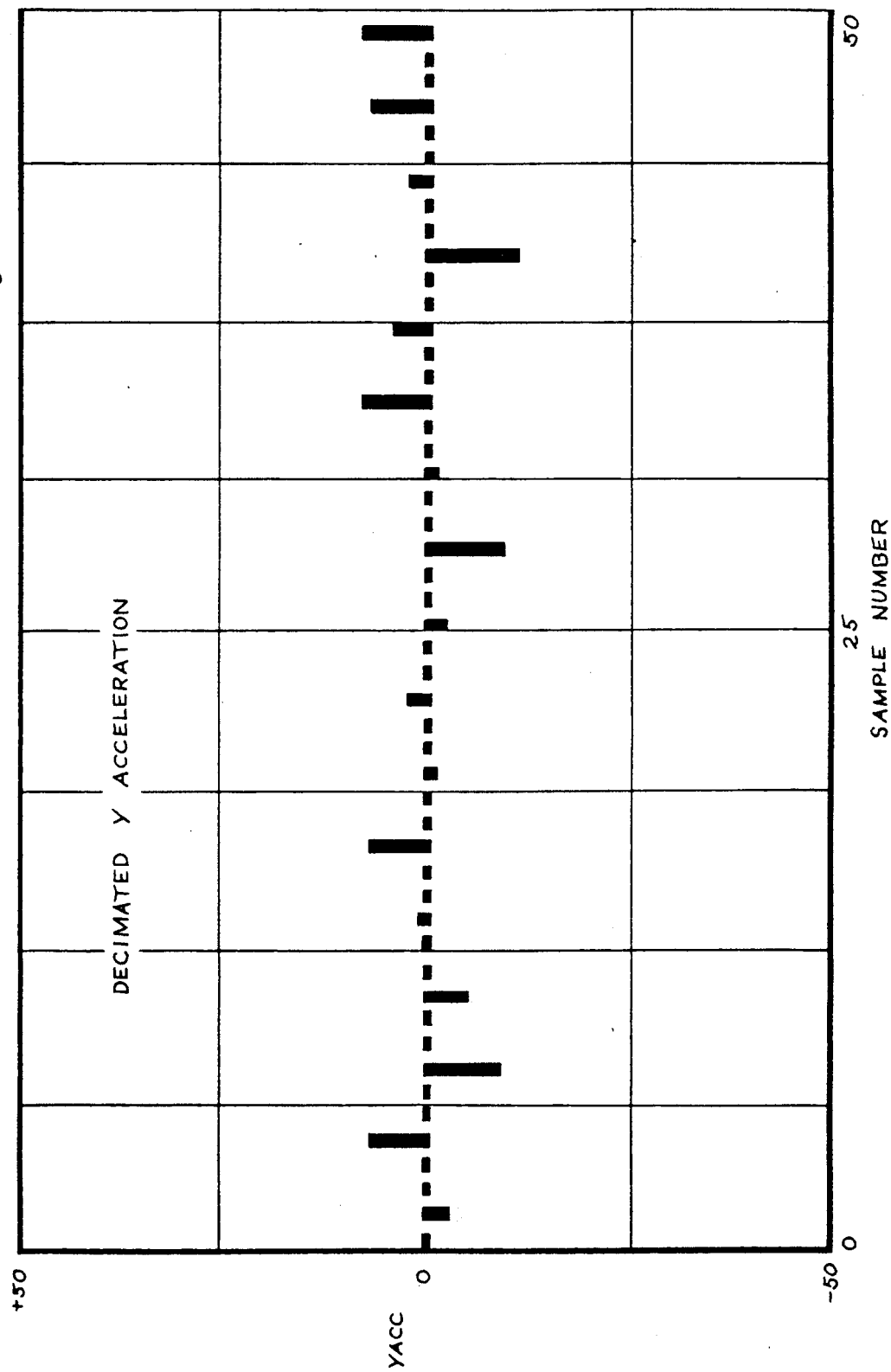

During enrollment, the digital filters 23, 25, and 27 provide their output to decimation logic 33, 35, and 37 respectively. The decimation logic deletes each two out of each three digital words representing samples of the acceleration and change in pressure. FIGS. 5a, 5b and 5c show this deletion graphically leaving only one third of the original samples. After decimation, the remaining data are stored in the memory 41 of an IC card.

Figure 6A:
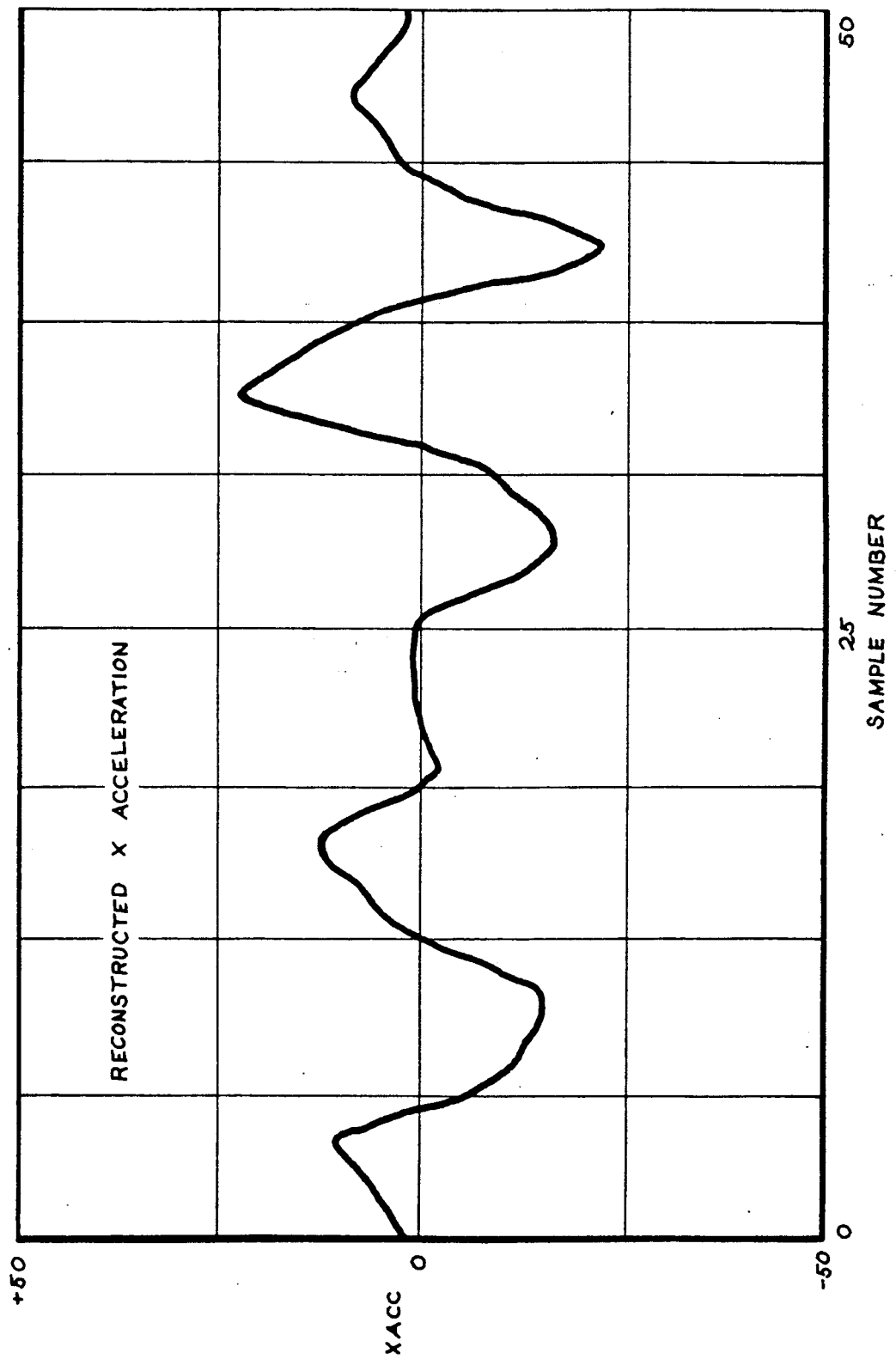
FIGS. 6a, 6b and 6c are waveforms showing the acceleration and change in pressure data after having been reconstructed by interpolation.
Figure 6B:
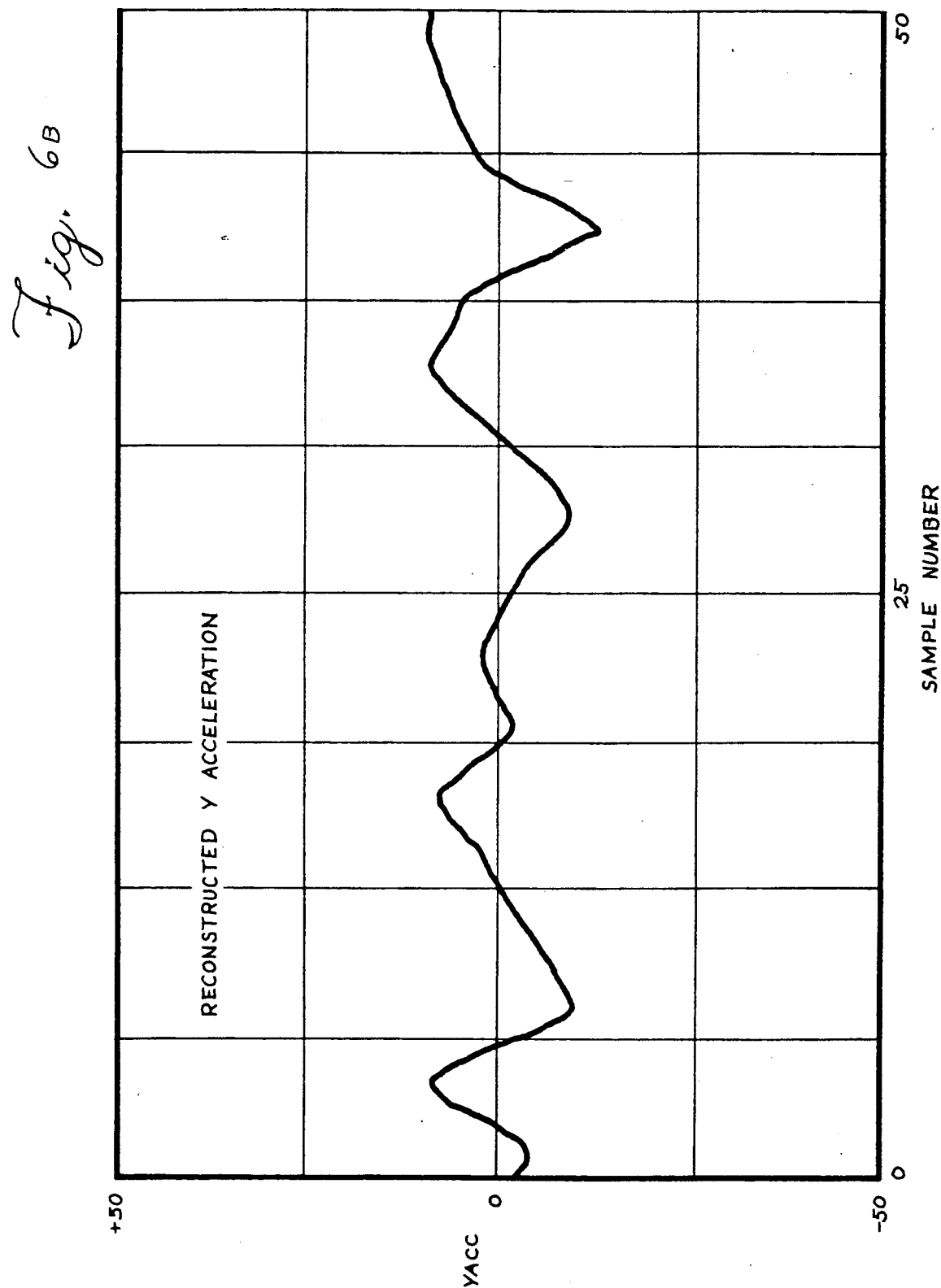
Figure 6C:
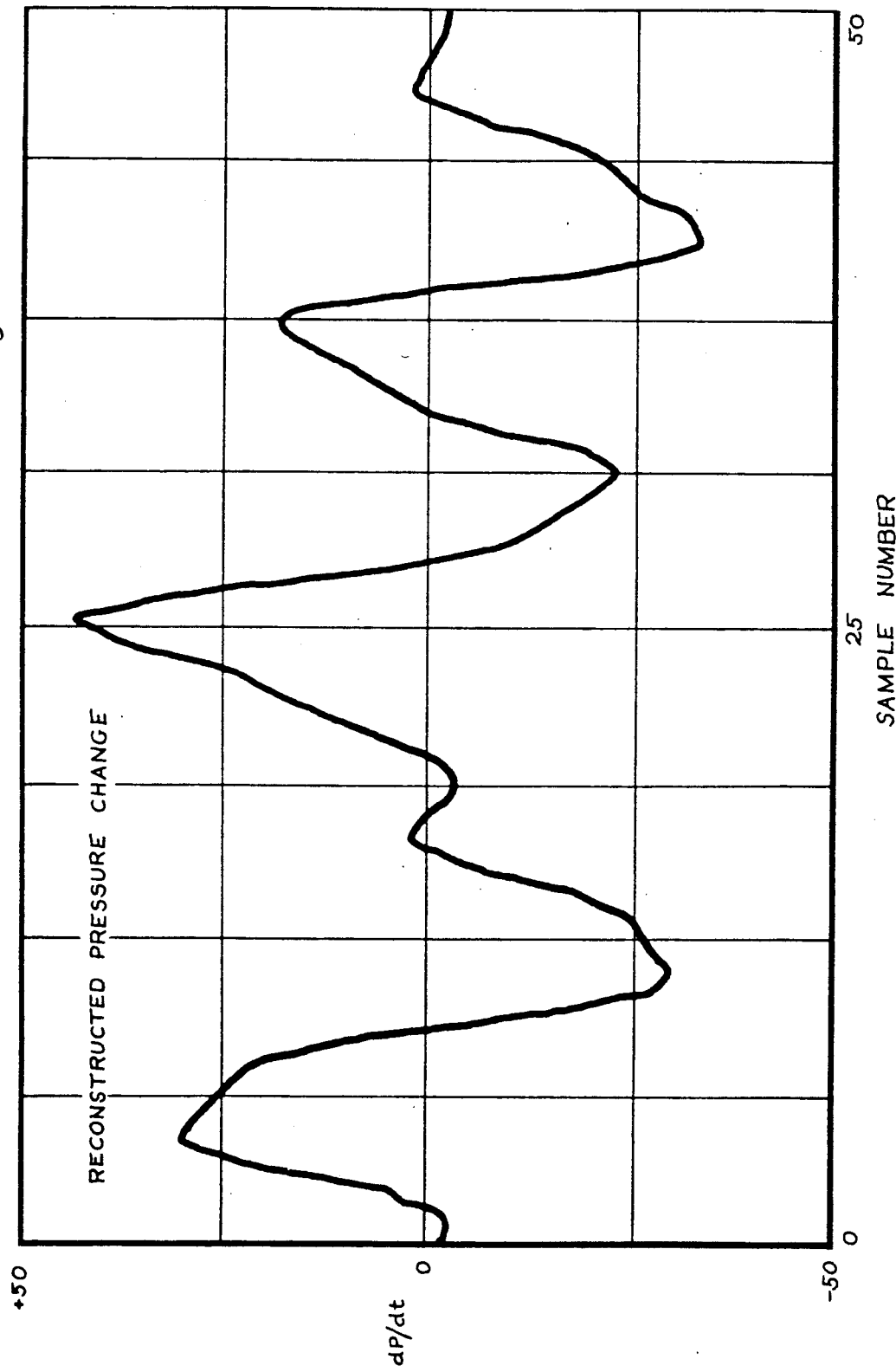

During the verification process, digital filters 23, 25 and 27 provide their output to segmentation and matching logic 31. Segmentation and matching logic 31 also receives the segment end points from extraction logic 29. Segmentation and matching logic 31 uses this information with corresponding information stored in memory 41 to develop the similarity measure of the two signatures using the algorithm described in U.S. Pat. No. 4,736,445. The acceleration and pressure change information is developed, using interpolator 39. Therefore, as logically shown in FIG. 2, interpolator 39 receives inputs from memory 41 and provides output to segmentation and matching logic 31. Interpolator 39 accomplishes the interpolation by inserting 0 value samples at each point in time corresponding to a sample deleted by one of decimators 33, 35 or 37. The information for X and Y acceleration and change in pressure with added 0 value samples is then passed through low-pass filters, identical to filters 23, 25 and 27. After filtering, the waveforms are restored to the shape which they had prior to decimation but their amplitude is reduced. Therefore, a gain of three is provided in order to restore the waveform. FIGS. 6a and 6b show the acceleration waveforms after having been reconstructed by interpolation. FIG. 6c shows the pressure change waveform after having been reconstructed by interpolation.

The digital values that make up the waveforms of FIG. 6a, 6b and 6c and the pen down/lift information from table II are input to final segmentation and matching logic 31. In addition, the acceleration and change of pressure data from filters 23, 25, 27 and the pen down and pen up points determined by logic 29 for the trial signature are input to final segmentation and matching logic 31. The reconstructed waveforms from interpolator 39 are matched using final segmentation, correlation and coherence measure calculations with the filtered waveforms provided by the pen 11. A degree of match is determined by the similarity measure to determine how well the trial signature matches a stored signature.

OPERATION OF THE ENROLLMENT PROCESS

Figure 7:
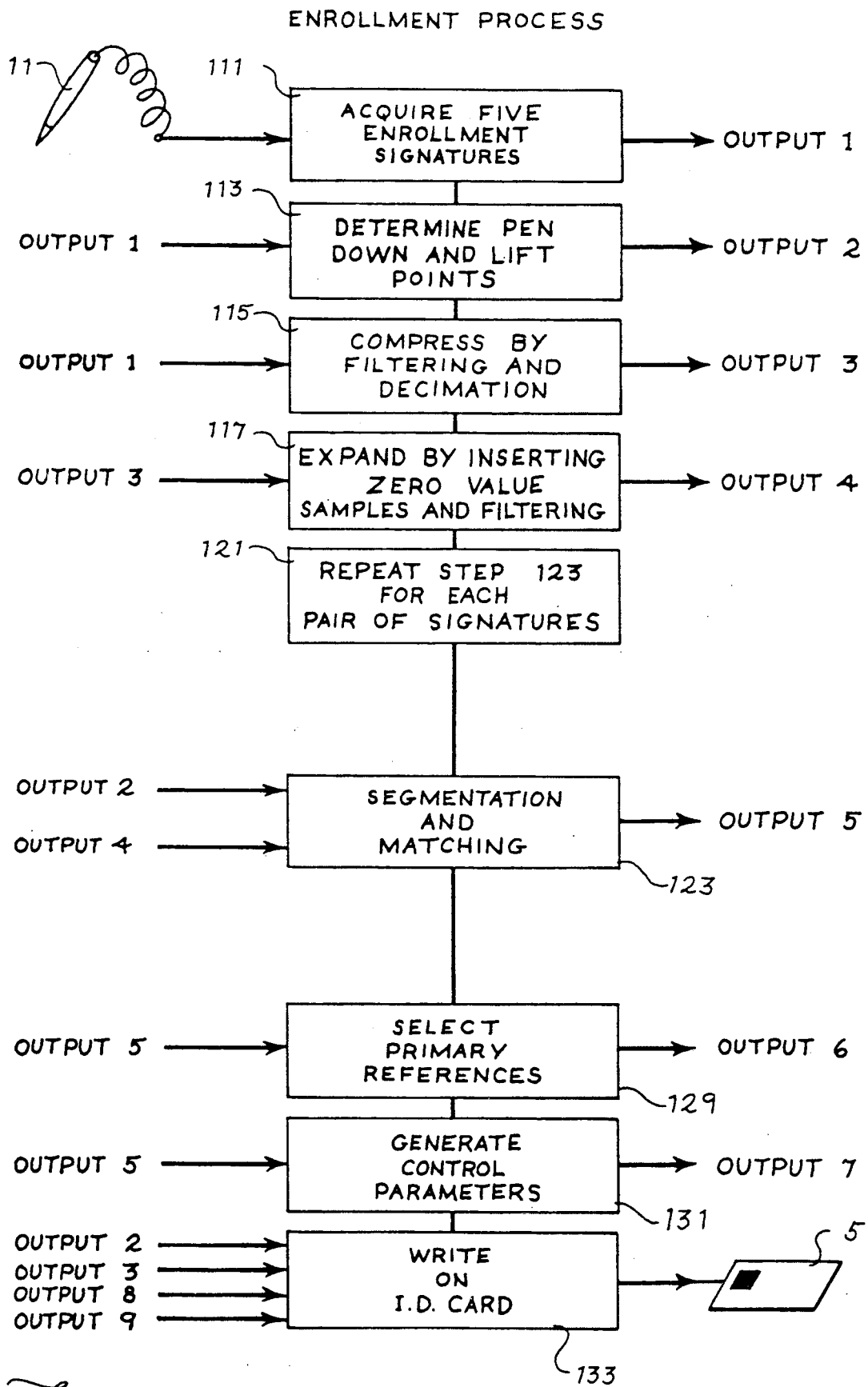
FIG. 7 shows a block diagram of the programmed functions which embody the enroll process according to the invention.

FIG. 7 shows a flowchart of the steps taken to enroll the signatures of an authorized holder of an identification card into the memory of the identification card utilizing the preferred embodiment.

Figure 3B:
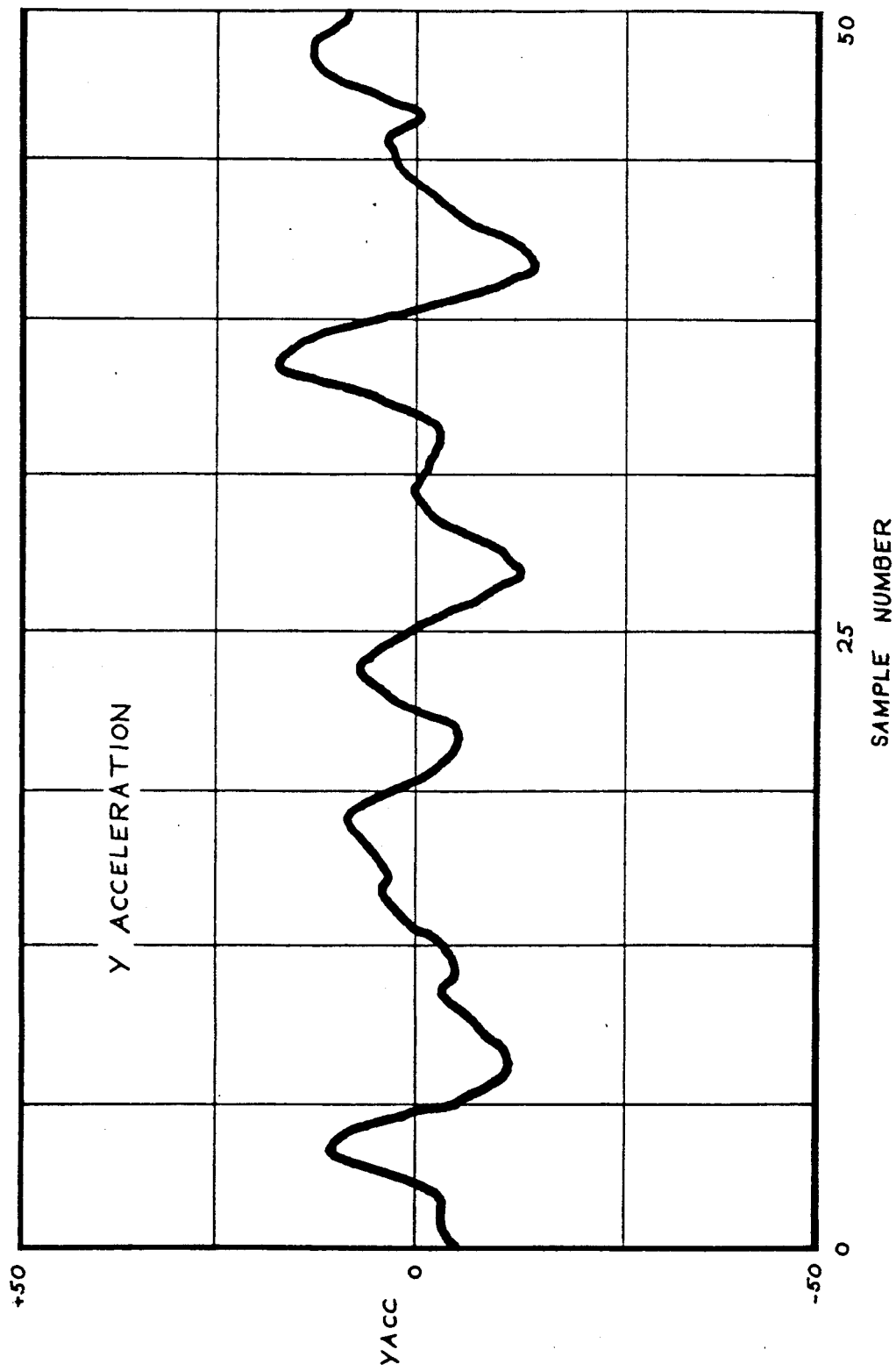

The enrollment process begins when the putative holder provides five signatures which are input into the system at block 111, using pen 11. The pen provides acceleration in the X direction, acceleration in the Y direction, and rate of change of pressure in analog form. The logic of block 111 converts the acceleration and change of pressure signals into digitized form, sampled at 80 samples per second, at output 1. The digitized values of acceleration and change of pressure for the portion of the example signature of the FIGS. 3a, 3b, and 3c, are listed in Table I.

TABLE I

| SAMPLE NUMBER | X AC-CELERATION | Y AC-CELERATION | DELTA PRESSURE |
|---|---|---|---|
| 1 | 1 | −4 | 0 |
| 2 | 2 | −3 | 0 |
| 3 | 8 | −3 | 0 |
| 4 | 13 | 4 | 20 |
| 5 | 9 | 12 | 33 |
| 6 | 4 | 7 | 31 |
| 7 | −1 | −6 | 34 |
| 8 | −12 | −11 | 22 |
| 9 | −19 | −10 | 3 |
| 10 | −19 | −7 | −14 |
| 11 | −14 | −3 | −25 |
| 12 | −6 | −4 | −32 |
| 13 | 0 | −4 | −38 |
| 14 | 4 | 1 | −27 |
| 15 | 7 | 5 | −9 |
| 16 | 12 | 4 | −2 |
| 17 | 14 | 6 | −1 |
| 18 | 8 | 9 | −1 |
| 19 | 3 | 6 | −1 |
| 20 | −1 | 2 | 0 |
| 21 | −4 | −5 | 0 |
| 22 | −2 | −5 | 0 |
| 23 | 2 | 3 | 16 |
| 24 | 3 | 8 | 40 |
| 25 | 4 | 4 | 46 |
| 26 | 2 | −1 | 40 |
| 27 | −7 | −8 | 28 |
| 28 | −15 | −13 | 9 |
| 29 | −17 | −10 | −11 |
| 30 | −14 | −2 | −20 |
| 31 | −9 | 1 | −19 |
| 32 | −6 | −1 | −21 |
| 33 | −6 | −2 | −20 |
| 34 | 4 | −2 | −10 |
| 35 | 22 | 6 | 5 |
| 36 | 30 | 18 | 16 |
| 37 | 24 | 15 | 20 |
| 38 | 5 | 3 | 19 |
| 39 | −11 | −8 | 3 |
| 40 | −20 | −15 | −18 |
| 41 | −20 | −12 | −33 |
| 42 | −15 | −5 | −39 |
| 43 | −7 | −1 | −37 |
| 44 | 3 | 3 | −22 |
| 45 | 7 | 4 | −6 |
| 46 | 9 | 0 | −2 |
| 47 | 10 | 6 | −1 |
| 48 | 5 | 13 | −1 |
| 49 | 2 | 14 | 0 |
| 50 | 1 | 9 | 0 |

This digitized information is stored in the memory of computer 9. Control then passes to block 113 which receives the five signatures of output 1 and produces output 2 which indicates pen down and pen lift points in the change of pressure waveform of each signature. The output 2 pen down and pen lift sample numbers shown in Table II are temporarily stored in a separate array for each signature in personal computer 9. The following table II shown an example initial segmentation array generated as output 2 from block 113. It includes the pen down and pen up points 61, 63, 65, 67 which are shown in the wave form of FIG. 3c.

TABLE II 4, 17, 22, 47, PDn, PUn, --, --,

In Table II the first entry "4," correspond to the pen down point 61 of FIG. 3c. The second entry "17," corresponds to the pen up point 63 in FIG. 3c. The next two entries correspond to points 65 and 67 in FIG. 3c and so forth for a continuation of a full signature change of pressure waveform. Control now passes to block 115, where a linear phase low pass filter program, with 6 decibel roll off at 12.5 cycles per second, operates on the output 1 digitized waveform data of each signature. Table III below is a listing of the samples of the portion of the example signature after they have been processed by the filter program. The filtered samples are the same data represented graphically in FIGS. 4a, 4b and 4c.

TABLE III

| SAMPLE NUMBER | X AC-CELERATION | Y AC-CELERATION | DELTA PRESSURE |
|---|---|---|---|
| 1 | 0 | −4 | −1 |
| 2 | 4 | −3 | 0 |
| 3 | 8 | 0 | 7 |
| 4 | 11 | 5 | 18 |
| 5 | 9 | 7 | 29 |
| 6 | 5 | 4 | 34 |
| 7 | −3 | −3 | 31 |
| 8 | −11 | −9 | 20 |
| 9 | −17 | −10 | 4 |
| 10 | −18 | −8 | −12 |
| 11 | −14 | −5 | −26 |
| 12 | −7 | −4 | −33 |
| 13 | −1 | −2 | −33 |
| 14 | 4 | 1 | −25 |
| 15 | 9 | 3 | −13 |
| 16 | 12 | 6 | −4 |
| 17 | 12 | 7 | 0 |
| 18 | 9 | 7 | 0 |
| 19 | 3 | 4 | −1 |
| 20 | −1 | −1 | −2 |
| 21 | −3 | −4 | −1 |
| 22 | −2 | −2 | 6 |
| 23 | 1 | 2 | 19 |
| 24 | 3 | 5 | 35 |
| 25 | 3 | 4 | 43 |
| 26 | 0 | −2 | 40 |
| 27 | −7 | −8 | 27 |
| 28 | −13 | −10 | 9 |
| 29 | −16 | −9 | −8 |
| 30 | −14 | −4 | −18 |
| 31 | −11 | −1 | −22 |
| 32 | −8 | −1 | −22 |
| 33 | −2 | −1 | −18 |
| 34 | 8 | 2 | −8 |
| 35 | 20 | 8 | 4 |
| 36 | 26 | 13 | 15 |
| 37 | 21 | 12 | 20 |
| 38 | 7 | 4 | 15 |
| 39 | −9 | −6 | 2 |
| 40 | −18 | −12 | −16 |
| 41 | −20 | −11 | −31 |
| 42 | −15 | −7 | −38 |
| 43 | −7 | −1 | −34 |
| 44 | 1 | 2 | −22 |
| 45 | 7 | 3 | −10 |
| 46 | 9 | 4 | −3 |
| 47 | 8 | 7 | 0 |
| 48 | 6 | 11 | 0 |
| 49 | 3 | 12 | 0 |
| 50 | 2 | 8 | −1 |

After being processed by the filter program, the samples are decimated by the decimation logic, also implemented in the program represented by block 115. The decimation logic discards two out of each three samples to accomplish compression of each of the five signatures into an effective sampling rate of eighty over three. The output 3 from block 115 appears in Table IV below which lists the samples of the example signature portion which remain after decimation. This is the same information shown in FIGS. 5a, 5b, and 5c.

TABLE IV

| SAMPLE NUMBER | X AC-CELERATION | Y AC-CELERATION | DELTA PRESSURE |
|---|---|---|---|
| 2 | 4 | −3 | 0 |
| 5 | 9 | 7 | 29 |
| 8 | −11 | −9 | 20 |
| 11 | −14 | −5 | −26 |
| 14 | 4 | 1 | −25 |
| 17 | 12 | 7 | 0 |
| 20 | −1 | −1 | −2 |
| 23 | 1 | 2 | 19 |
| 26 | 0 | −2 | 40 |
| 29 | −16 | −9 | −8 |
| 32 | −8 | −1 | −22 |
| 35 | 20 | 8 | 4 |
| 38 | 7 | 4 | 15 |
| 41 | −20 | −11 | −31 |
| 44 | 1 | 2 | −22 |
| 47 | 8 | 7 | 0 |
| 50 | 2 | 8 | −1 |

Block 117 then obtains control where each of the five compressed signatures of output 3 is expanded in order to accomplish matching between them for determination of the primary reference signatures. The signatures are expanded by inserting two zero valued samples between each sample of the decimated data, and this augmented data are then filtered, using the same digital filter program of block 115. The resultant values are then multiplied by three to bring the amplitude back up to the level that existed prior to decimation. The output 4 from block 117 is shown in Table V which follows. It is a listing of samples of the example signature after they have been augmented, filtered, and multiplied by three which restores them to an accurate representation of the original filtered waveforms.

TABLE V

| SAMPLE NUMBER | X AC-CELERATION | Y AC-CELERATION | DELTA PRESSURE |
|---|---|---|---|
| 1 | 2 | −3 | −2 |
| 2 | 4 | −4 | −2 |
| 3 | 6 | 0 | 7 |
| 4 | 9 | 6 | 23 |
| 5 | 11 | 9 | 31 |
| 6 | 4 | 4 | 29 |
| 7 | −6 | −5 | 26 |
| 8 | −12 | −10 | 22 |
| 9 | −13 | −9 | 8 |
| 10 | −15 | −7 | −15 |
| 11 | −15 | −5 | −29 |
| 12 | −10 | −3 | −30 |
| 13 | −1 | −1 | −28 |
| 14 | 5 | 1 | −26 |
| 15 | 7 | 3 | −19 |
| 16 | 11 | 6 | −6 |
| 17 | 13 | 8 | 2 |
| 18 | 9 | 5 | 1 |
| 19 | 2 | 1 | −3 |
| 20 | −2 | −2 | −3 |
| 21 | −1 | −1 | 3 |
| 22 | 0 | 1 | 12 |
| 23 | 1 | 2 | 19 |
| 24 | 1 | 1 | 26 |
| 25 | 1 | 0 | 39 |
| 26 | 1 | −2 | 44 |
| 27 | −4 | −4 | 30 |
| 28 | −13 | −8 | 5 |
| 29 | −17 | −10 | −10 |
| 30 | −16 | −8 | −15 |

TABLE V-continued

| SAMPLE NUMBER | X AC-CELERATION | Y AC-CELERATION | DELTA PRESSURE |
|---|---|---|---|
| 31 | −12 | −4 | −21 |
| 32 | −9 | −1 | −24 |
| 33 | 0 | 2 | −17 |
| 34 | 14 | 6 | −3 |
| 35 | 23 | 9 | 5 |
| 36 | 19 | 8 | 9 |
| 37 | 13 | 6 | 16 |
| 38 | 8 | 5 | 19 |
| 39 | −1 | 0 | 4 |
| 40 | −15 | −8 | −20 |
| 41 | −23 | −13 | −34 |
| 42 | −17 | −9 | −33 |
| 43 | −5 | −2 | −26 |
| 44 | 2 | 3 | −23 |
| 45 | 4 | 4 | −16 |
| 46 | 7 | 6 | −5 |
| 47 | 9 | 7 | 2 |
| 48 | 7 | 8 | 1 |
| 49 | 4 | 9 | 1 |
| 50 | 2 | 9 | −2 |

Block 121 is program loop control logic which controls the matching process of block 123. Block 123 receives as input, the initial segmentation output 2 and the reconstructed signature data output 4. It matches each of the five signatures with the other four signatures to generate correlation and coherence scores. Matching is accomplished using detailed segmentation, correlation, and coherence between each two signatures of the five signatures. This process is described in greater detail beginning at column 6 of U.S. Pat. No. 4,736,445, which is incorporated herein by reference. Block 123 generates output 5 which is a matrix of correlation scores and a matrix of coherence scores.

At block 129, the output 5 is utilized to select two primary reference signatures from the the five enrollment signatures. The selection process yields the result of selecting the primary reference signatures having coherence scores that span the group of signatures. That is the signatures that are furthest apart without including an aberration signature. The input to block 129 is output 5 matrixes and generates output 6 which is an array indicating which of the signatures are to be used as primary references.

Block 131 logic acts upon the output 5 to generate output 7 which is the similarity control parameters, zero pressure time to identify a pen lift, maximum segment length, allowed percentage of shift off center between two segments when determining their maximum correlation, and the overall reference adjustment parameter. These factors and adjustments allow the differences in the degree of consistency of signature dynamics from one person to another to be exploited to reject a forgery that otherwise would pass as the signature of an authorized card holder. These factors and adjustments and the primary reference selection methods are described in more detail beginning at column 13 of U.S. Pat. No. 4,736,445 which has been incorporated herein by reference.

These five signatures are then written at block 133 into the memory 41 on the IC card. The records written include the output 2 representing pen up and pen down indices for each of the five signatures, output 3 which is the compressed representation of each of the five signatures in the form of X and Y acceleration and change in pressure, output 6 the primary reference and chronology indicators of these signatures, and the output 7 which is the control parameters. Five reference signatures and the necessary control factors and adjustment information are now stored on the IC card, ready for use during a signature verification operation.

OPERATION OF THE VERIFICATION PROCESS

Figure 8:
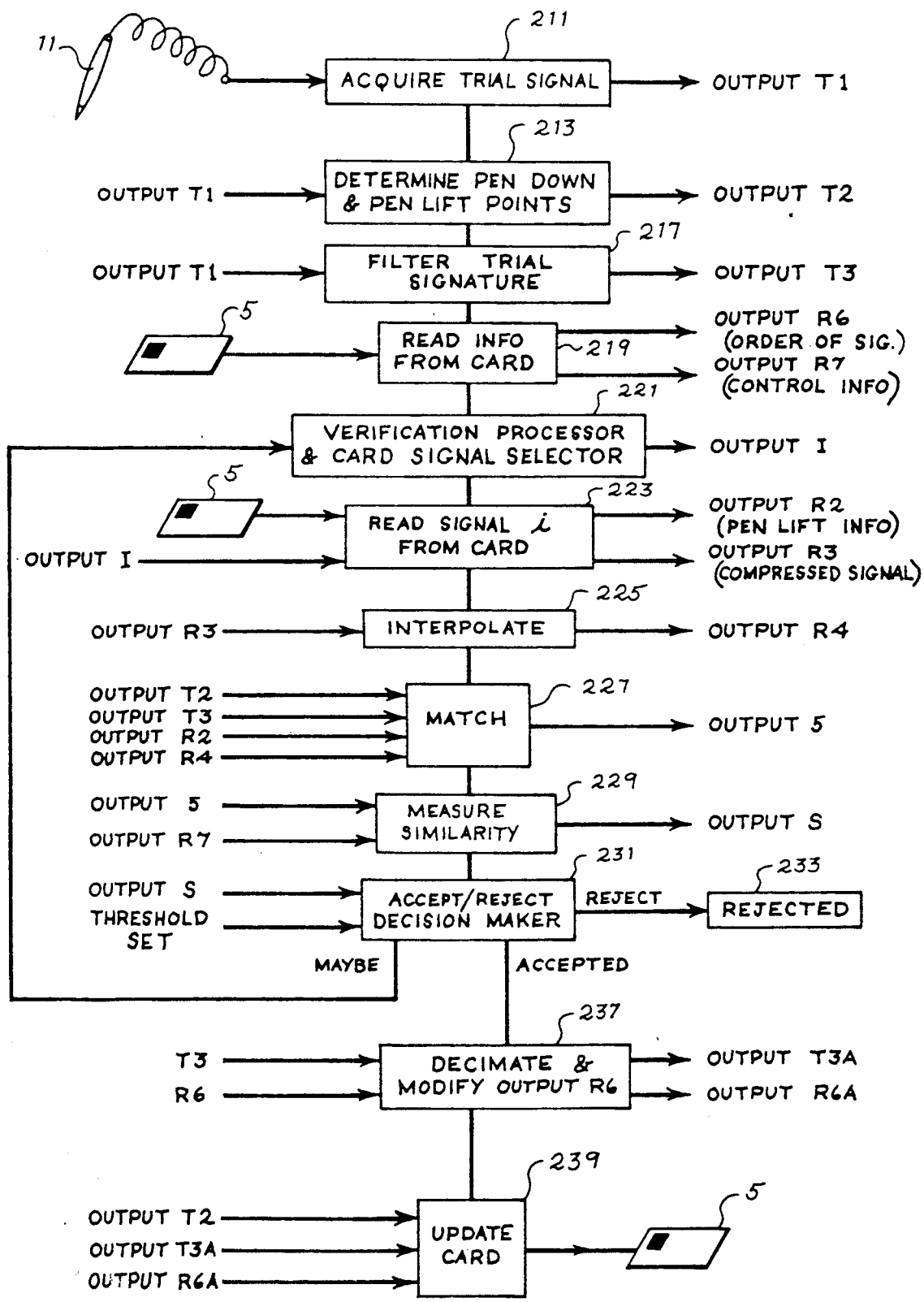
FIG. 8 shows a block diagram of the programmed functions which embody the verify process according to the invention.

In FIG. 8, the pen 11 is again used, this time to acquire a trial signature consisting of digitized samples, again at the rate of 80 samples per second, of each of the three dynamic components, that is X and Y acceleration and the Z rate of change of pressure. The digitized signature values are acquired and stored as output T1 at block 211 of FIG. 8.

Control then passes to block 213 where the trial signature from pen down and pen lift points are located the output T1 received from block 211 and stored in the computer as output T2.

At block 217 the acceleration values and change of pressure values of output T1 are filtered with a digital filter having the same characteristics as that used during enrollment to provide output T3.

Control then passes to block 219 where the output 6 which is an array indicating which of the reference signatures are to be used as primary references and output 7 which is the control parameters are read in from the ID card 5 and stored into the computer memory.

Block 221 controls the selection of a signature i as the reference to use for matching with the trial signature. The selection appears as output I. Details of this selection process are taught by Williford in U.S. Pat. No. 4,724,542 which has previously been incorporated by reference. After the reference signature has been selected, control passes to block 223 where the selected reference signature is read from ID card 5. Accordingly at block 223, the selected reference pen down and pen lift points are read and stored as output R2 and the compressed reference signatures are read from the ID card, and stored in the computer memory as output R3.

At block 225 the selected reference signature read from the card 5 is expanded by interpolating between the samples read from the card to generate output 4. The same step of zero insertion and filtering is used as was done during the enrollment process in the preferred embodiment.

Block 227 receives as input, the initial segmentation output T2, the filtered data signal T3, the initial segmentation output R2, and the reconstructed signature data output R4 read from the card. It matches the trial and selected reference signatures with each other to generate segmentation, correlation and coherence measures. Matching is accomplished using detailed segmentation, correlation, and coherence between the two signatures. This process is described in greater detail beginning at column 6 of U.S. Pat. No. 4,736,445, which is incorporated herein by reference. Block 227 generates output 5.

Control then passes to decision block 229 which receives as inputs, output 5 which are the segmentation, correlation and coherence measures and output R7 which are the control parameters read from the card 5. Block 229 generates a similarity measure output S indicating a degree of match between the two signatures.

Control then passes to decision block 231 which receives as inputs, the output S and a threshold set. The threshold set is a pair constants that are chosen empirically and reside in the computer memory. The decision process is described out in detail in U.S. Pat. No.

4,724,542 to Williford. Three possible decision paths radiate from block 231. The "accepted" path to block 237 is taken when the trial signature matches a reference signature with a similarity measure greater than the acceptance threshold. The "maybe" path 235 is taken if the similarity measure of the trial signature with the first primary reference is below the acceptance threshold but above a closeness threshhold. This path results in control returning to block 221 where another reference is chosen. If the similarity measure of the trial signature with both of the primary references are below the closeness threshold, the reject path to block 233 is taken. If the trial signature match with either of the primary references is close enough to be above the closeness threshold, but not above the acceptance threshold, a match of the trial signature with the other reference signatures is initiated. If any of these scores exceed the acceptance threshold, the trial signature is accepted as verification of the identity of the card holder.

At block 237, the trial signature is converted into a reference signature by the same process of discarding two out of three samples. This block also reorders the reference signatures in the form of output R6A, also described in U.S. Pat. No. 4,724,542.

The ID card 5 is then updated at block 239 by writing the compressed trial signature output T3A into memory 41 of card 5 in the location of the least recent reference. At the same time, the new reference signature order output R6A and pen lift array output T2 are stored.

Having described the invention in terms of the preferred embodiment, it is understood that various changes in implementation and application of the invention may be made in the use thereof without departing from the invention.

What is claimed is:

1. The method of enrolling signature information of an authorized user onto an identification card comprising the steps of:

(a) acquiring a first signal and a second signal representative of a signature of said user;
   (b) sampling said first signal at a rate of at least n times a highest frequency component of said first signal which is to be preserved, where n is an integer greater than three;
   (c) sampling said second signal at a rate of at least m times a highest frequency component of said second signal which is to be preserved, where m is an integer greater than three;
   (d) locating portions of said first signal representative of periods of time when said pen was in contact with a writing surface;
   (e) storing on said card, an array of the starting and ending times identifying when said pen was in contact with said writing surface;
   (f) digitally filtering said samples representing said first signal to remove substantially all energy at frequencies above said highest frequency component of said first signal to be preserved;
   (g) digitally filtering said samples representing said second signal to remove substantially all energy at frequencies above said highest frequency component of said second signal to be preserved;
   (h) discarding $(n/2) - 1$ of said filtered first samples out of each n/2 of said filtered first samples;
   (i) discarding $(m/2) - 1$ of said filtered second samples out of each m/2 of said filtered second samples;
   (j) storing the remaining of said filtered first samples on said card;
   (k) storing the remaining of said filtered second samples on said card.

2. The method of claim 1, wherein said first signal is a change of pressure signal and said second signal is an acceleration signal.

3. The method of claim 2, further comprising the steps of:

repeating steps (a) through (i) at least five times to acquire at least five signatures;
   matching the respective samples of each signature with the corresponding samples of each other signature to obtain a segmentation measure, correlation measure and a coherence measure for each pair of signatures;
   selecting as primary reference signatures, a pair of said signatures;
   repeating steps (j) and (k) to store said primary reference signatures.

4. The method of claim 3, further comprising the step of:

again performing steps j) and k) to store a secondary reference signature.

5. The method of verifying the identity of a holder of an identification card having signature information of an authorized user stored thereon, comprising the steps of:

acquiring a first signal and a second signal representative of a trial signature of said holder;
   sampling said first signal at a rate of at least n times a highest frequency component of said first signal which is to be preserved, where n is an integer greater than three;
   sampling said second signal at a rate of at least m times a highest frequency component of said second signal which is to be preserved, where m is an integer greater than three;
   locating portions of said first signal representative of periods of time when a trial signature pen was in contact with a writing surface;
   digitally filtering said samples representing said first signal to remove substantially all energy at frequencies above said highest frequency component of said first signal to be preserved;
   digitally filtering said samples representing said second signal to remove substantially all energy at frequencies above said highest frequency component of said second signal to be preserved;
   reading from said identification card, third samples representing a third signal and fourth samples representing a fourth signal,
   reading from said identification card, an array of starting and ending times identifying when a reference signature pen was in contact with a writing surface while writing a reference signature represented by said third and said fourth samples;
   interpolating between each of said third samples to recover $(m/2)-1$ samples representative of samples of said third signal which had been discarded prior to storing said third samples on said card, m being an integer greater than three;
   interpolating between each of said fourth samples to recover $(n/2)-1$ samples representative of samples of said fourth signal which had been discarded prior to storing said fourth samples on said card, n being an integer greater than three;

identifying those third samples and recovered samples of said third signal which represent said third signal while said reference signature pen was in contact with writing surface;

identifying those fourth samples and recovered samples of said fourth signal which represent said fourth signal while said reference signature pen was in contact with said writing surface;

matching said first samples representing said first signal when said trial pen was in contact with said writing surface with said identified third samples and recovered samples of said third signal which represent said third signal while said reference signature pen was in contact with writing surface and matching said second samples representing said second signal when said trial pen was in contact with said writing surface with said identified fourth samples and recovered samples of said fourth signal which represent said fourth signal while said reference signature pen was in contact with writing surface to obtain a similarity measure;

accepting said holder of said identification card as said authorized user of said identification card if said similarity measure is greater than a threshold.

6. The method of claim 5, further comprising the steps of:

tentatively rejecting said holder of said identification card as said authorized user of said identification card if said similarity measure is less than said threshold;

reading from said identification card, fifth samples representing a fifth signal and sixth samples representing a sixth signal, reading from said identification card, an array of starting and ending times identifying when a reference signature pen was in contact with a writing surface while writing a reference signature represented by said fifth and said sixth samples;

interpolating between each of said fifth samples to recover (n/2)−1 samples representative of samples of said fifth signal which had been discarded prior to storing said fifth samples on said card, n being an integer greater than three.

interpolating between each of said sixth samples to recover (m/2)−1 samples representative of samples of said sixth signal which had been discarded prior to storing said sixth samples on said card, m being an integer greater than three.

identifying those fifth samples and recovered samples of said fifth signal which represent said fifth signal while said reference signature pen was in contact with writing surface;

identifying those sixth samples and recovered samples of said sixth signal which represent said sixth signal while said reference signature pen was in contact with said writing surface;

matching said first samples representing said first signal when said trial pen was in contact with said writing surface with said identified fifth samples and recovered samples of said fifth signal which represent said fifth signal while said reference signature pen was in contact with a writing surface and matching said second samples representing said second signal when said trial pen was in contact with said writing surface with said identified sixth samples and recovered samples of said sixth signal which represent said sixth signal while said reference signature pen was in contact with a writing surface to obtain a second score; accepting said holder of said identification card as said authorized user of said identification card if said second similarity measure is greater than said threshold.

7. The method of reducing for storage, a number of digital samples needed to represent a signal and recovering representative samples for correlation with another signal, comprising the steps of:

sampling said signal at a rate exceeding n times a highest frequency component of said signal which is to be preserved, where n is an integer greater than three;

digitally filtering said samples representing said signal to remove substantially all energy at frequencies above said highest frequency component of said signal to be preserved;

discarding (n/2) − 1 of said samples out of each n/2 of said samples;

storing the remaining of said samples;

interpolating between each of said stored samples to recover (n/2) −1 samples representative of said samples which have been discarded.

8. The method of claim 7, wherein said step of interpolating further comprises the steps of:

inserting (n/2 − 1) zero valued samples between each of said stored samples to restore an original number of samples.

digitally filtering said restored samples to remove substantially all energy at frequencies above said highest frequency component of said signal to be preserved;

multiplying each filtered sample by n/2 to restore said filtered samples to an amplitude representative of said signal.

9. The method of reducing for storage, a number of digital samples needed to represent information in a signal to permit recovery of representative samples for correlation with another signal, comprising the steps of:

sampling said signal at a rate exceeding n times a highest frequency component of said signal which is to be preserved, where n is an integer greater than three;

segmenting said signal and storing a starting sample number and number of samples for each segment;

digitally filtering said samples representing said signal to remove substantially all energy at frequencies above said highest frequency component of said signal to be preserved;

discarding (n/2) − 1 of said samples out of each n/2 of said samples;

storing the remaining of said samples.

10. The method of claim 9 further comprises the steps of:

interpolating between each of said stored samples to recover (n/2) − 1 samples representative of said samples which have been discarded.

11. The method of compressing signature information signals for storage comprising the steps of:

sampling said signals at a rate exceeding n times a highest frequency component of said signal which is to be preserved, where n is an integer greater than three;

segmenting one of said signals and storing a starting sample number and number of samples for each segment;

digitally filtering said samples representing each of said signals to remove substantially all energy at frequencies above said highest frequency component of said signal to be preserved;

discarding (n/2) − 1 of said samples out of each n/2 of said samples;

storing the remaining of said samples of each of said signals.

12. The method of claim 11, wherein said one of said signals is a change of pressure signal and where another of said signals is and acceleration signal.

13. The method of restoring a segment of said change of pressure signal of claim 12 comprising the steps of:

inserting (n/2 − 1) zero valued samples between each of said stored samples to restore an original number of samples.

digitally filtering said restored samples to remove substantially all energy at frequencies above said highest frequency component of said signal to be preserved;

multiplying each filtered sample by n/2 to restore said filtered samples to an amplitude representative of said signal.

14. A computer program for enrolling a signature of an authorized user onto an identification card comprising:

means for receiving a first signal representative of changes in pressure between a pen and a writing surface during signing of said signature by said user, said first signal having been sampled at a rate of at least n times a highest frequency component of said first signal which is to be preserved, where n is an integer greater than three; means for receiving a second signal representative of acceleration of said pen during signing of said signature by said user, said second signal having been sampled at a rate of at least m times a highest frequency component of said first signal which is to be preserved, where m is an integer greater than three;

means for locating portions of said first signal representative of periods of time when said pen was in contact with a writing surface;

means for storing on said card, an array of the starting and ending samples identifying when said pen was in contact with said writing surface;

means for digitally filtering said samples representing said first signal to remove substantially all energy at frequencies above said highest frequency component of said first signal to be preserved;

means for digitally filtering said samples representing said second signal to remove substantially all energy at frequencies above said highest frequency component of said second signal to be preserved;

means for discarding (n/2) − 1 of said filtered first samples out of each n/2 of said filtered first samples;

means for discarding (m/2) − 1 of said filtered second samples out of each m/2 of said filtered second samples;

means for storing the remaining of said filtered first samples on said card;

means for storing the remaining of said filtered second samples on said card.

15. The computer program of claim 14, further comprising: means for repeatedly operating said means for receiving, means for locating, means for filtering, and means for discarding of claim 14 to acquire at least five signatures;

means for matching the respective samples of each signature with the corresponding samples of each other signature to obtain a segmentation measure, correlation measure and a coherence measure for each pair of signatures;

means for selecting as primary reference signatures, a pair of said signatures;

means for storing said primary reference signatures on said card.

16. A computer program for verifying the identity of a holder of an identification card having signature information of an authorized user stored thereon comprising:

means for receiving a first signal representative of a trial signature of said holder, said first signal having been sampled at a rate of at least n times a highest frequency component of said first signal which is to be preserved, where n is an integer greater than three;

means for receiving a second signal representative of said trial signature of said holder, said second signal having been sampled at a rate of at least m times a highest frequency component of said second signal which is to be preserved, where m is an integer greater than three;

means for locating portions of said first signal representative of periods of time when said trial signature pen was in contact with a writing surface;

means for digitally filtering said samples representing said first signal to remove substantially all energy at frequencies above said highest frequency component of said first signal to be preserved;

means for digitally filtering said samples representing said second signal to remove substantially all energy at frequencies above said highest frequency component of said second signal to be preserved;

means for receiving from said identification card, third samples representing a third signal and fourth samples representing a fourth signal, means for receiving from said identification card, an array of starting and ending times identifying when a reference signature pen was in contact with a writing surface while writing a reference signature represented by said third and said fourth samples;

means for interpolating between each of said third samples to recover (m/2)−1 samples representative of samples of said third signal which had been discarded prior to storing said third samples on said card, m being an integer greater than three.

means for interpolating between each of said fourth samples to recover (n/2)−1 samples representative of samples of said fourth signal which had been discarded prior to storing said fourth samples on said card, n being an integer greater than three.

means for identifying those third samples and recovered samples of said third signal which represent said third signal while said reference signature pen was in contact with writing surface;

means for identifying those fourth samples and recovered samples of said fourth signal which represent said fourth signal while said reference signature pen was in contact with said writing surface;

means for matching said first samples representing said first signal when said trial pen was in contact with said writing surface with said identified third samples and recovered samples of said third signal which represent said third signal while said reference signature pen was in contact with writing surface and matching said second samples representing said second signal when said trial pen was in contact with said writing surface with said identified fourth samples and recovered samples of said fourth signal which represent said fourth signal while said reference signature pen was in contact with writing surface to obtain a similarity measure;

means for accepting said holder of said identification card as said authorized user of said identification card if said similarity measure is greater than a threshold.

17. A program for reducing a number of digital samples needed to represent a handwriting signal sampled at a rate exceeding n times a highest frequency component of said signal which is to be preserved, where n is an integer greater than three and recovering representative samples for correlation with another signal, comprising:

means for locating portions of said signal representative of periods of time when a signature pen was in contact with a writing surface;

means for filtering said samples representing said signal to remove substantially all energy at frequencies above said highest frequency component of said signal to be preserved;

means for discarding (n.2) − 1 of said samples out of each n/2 of said samples;

means for interpolating between each of said stored samples to recover (n/2) − 1 samples representative of said samples which have been discarded.

18. The program of claim 17, wherein said means for interpolating further comprises:

means for inserting (n/2 − 1) zero valued samples between each of said stored samples to restore an original number of samples.

means for digitally filtering said restored samples to remove substantially all energy at frequencies above said highest frequency component of said signal to be preserved;

means for multiplying each filtered sample by n/2 to restore said filtered samples to an amplitude representative of said signal.

19. A system for reducing for storage, a number of digital samples needed to represent information in a signal to permit recovery of representative samples for correlation with another signal, comprising:

means for sampling said signal at a rate exceeding n times a highest frequency component of said signal which is to be preserved, where n is an integer greater than three;

means for segmenting said signal and storing a starting sample number and number of samples for each segment;

means for digitally filtering said samples representing said signal to remove substantially all energy at frequencies above said highest frequency component of said signal to be preserved;

means for discarding (n/2) − 1 of said samples out of each n/2 of said samples;

means for storing the remaining of said samples.

20. The system of claim 19, further comprising:

means for interpolating between each of said stored samples to recover (n/2) − 1 samples representative of said samples which have been discarded.

21. The apparatus for compressing signature information signals for storage, comprising:

means for sampling said signals at a rate exceeding n times a highest frequency component of said signal which is to be preserved, where n is an integer greater than three;

means for segmenting one of said signals and storing a starting sample number and number of samples for each segment;

means for digitally filtering said samples representing each of said signals to remove substantially all energy at frequencies above said highest frequency component of said signal to be preserved;

means for discarding (n/2) − 1 of said samples out of each n/2 of said samples;

means for storing the remaining of said samples of each of said signals.

22. The apparatus of claim 21 wherein said one of said signals is a change of pressure signal and where another of said signals is an acceleration signal.

23. The apparatus for restoring a segment of said change of pressure signal of claim 22, comprising:

means for inserting (n/2 − 1) zero values samples between each of said stored samples to restore an original number of samples.

means for digitally filtering said restored samples to remove substantially all energy at frequencies above said highest frequency component of said signal to be preserved.

* * * * *